United States Patent
Peng et al.

(10) Patent No.: US 11,811,503 B2
(45) Date of Patent: Nov. 7, 2023

(54) METHOD AND APPARATUS FOR SWITCHING CLOCK SOURCES

(71) Applicant: Telefonaktiebolaget LM Ericsson (publ), Stockholm (SE)

(72) Inventors: Yao Peng, Beijing (CN); Jun Wang, Beijing (CN); Daiying Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 3 days.

(21) Appl. No.: 17/606,799

(22) PCT Filed: Apr. 29, 2019

(86) PCT No.: PCT/CN2019/084888
§ 371 (c)(1),
(2) Date: Oct. 27, 2021

(87) PCT Pub. No.: WO2020/220177
PCT Pub. Date: Nov. 5, 2020

(65) Prior Publication Data
US 2022/0209882 A1    Jun. 30, 2022

(51) Int. Cl.
*H04J 3/06* (2006.01)

(52) U.S. Cl.
CPC .......... *H04J 3/0667* (2013.01); *H04J 3/0617* (2013.01); *H04J 3/0629* (2013.01); *H04J 3/0688* (2013.01)

(58) Field of Classification Search
None
See application file for complete search history.

(56) References Cited

U.S. PATENT DOCUMENTS

| | | | |
|---|---|---|---|
| 9,450,846 B1 * | 9/2016 | Huang | H04L 43/106 |
| 11,095,383 B2 * | 8/2021 | Wang | H04J 3/0673 |
| 2010/0177666 A1 * | 7/2010 | Cheng | H04L 12/403 |
| | | | 370/254 |
| 2011/0158120 A1 * | 6/2011 | Hamasaki | H04J 3/0688 |
| | | | 370/252 |

(Continued)

FOREIGN PATENT DOCUMENTS

| | | |
|---|---|---|
| EP | 2 688 240 A1 | 1/2014 |
| EP | 2 802 097 A1 | 11/2014 |

OTHER PUBLICATIONS

International Telecommunication Union, ITU-T, Telecommunication Standardization Sector of ITU, G.8275.2/Y.1369.2 Amendment 2, Series G: Transmission System and Networks, Mar. 2018 (79 pages).

(Continued)

*Primary Examiner* — Kodzovi Acolatse
(74) *Attorney, Agent, or Firm* — Rothwell, Figg, Ernst & Manbeck, P.C.

(57) ABSTRACT

A method for switching clock sources is provided. In the method, Precision Time Protocol, PTP, packets are monitored using each of PTP ports which connect to a new grandmaster (401). A frequency and a phase for the PTP port are calculated based on the PTP packets (402). In response to a successful check for the frequency and the phase, the PTP port is added to a candidate list (403). A phase calibration and a phase stability check may be introduced prior to the alternate BMCA.

7 Claims, 4 Drawing Sheets

(56) References Cited

U.S. PATENT DOCUMENTS

| | | | | |
|---|---|---|---|---|
| 2012/0300859 A1* | 11/2012 | Chapman | | H04J 3/0664 375/257 |
| 2013/0227008 A1* | 8/2013 | Yang | | H04J 3/0667 709/204 |
| 2013/0227172 A1* | 8/2013 | Zheng | | H04J 3/0667 709/248 |
| 2013/0279525 A1* | 10/2013 | Zheng | | H04J 3/0667 370/516 |
| 2014/0010244 A1* | 1/2014 | Bui | | H04J 3/0697 370/503 |
| 2014/0185632 A1 | 7/2014 | Steiner et al. | | |
| 2014/0281037 A1 | 9/2014 | Spada et al. | | |
| 2015/0092794 A1* | 4/2015 | Aweya | | H04J 3/0667 370/503 |
| 2015/0092796 A1* | 4/2015 | Aweya | | H04J 3/0667 370/516 |
| 2015/0092797 A1* | 4/2015 | Aweya | | H04J 3/0667 370/516 |
| 2015/0318941 A1* | 11/2015 | Zheng | | H04J 3/0697 370/503 |
| 2016/0065322 A1* | 3/2016 | Cao | | H04J 3/0658 370/503 |
| 2016/0156427 A1 | 6/2016 | Yang et al. | | |
| 2018/0091291 A1* | 3/2018 | Haddad | | H04L 7/0331 |
| 2019/0138047 A1* | 5/2019 | El Kolli | | G06F 1/12 |
| 2019/0379475 A1* | 12/2019 | Seethamraju | | H04J 3/0667 |
| 2020/0280383 A1* | 9/2020 | Herber | | H04J 3/0638 |
| 2022/0326728 A1* | 10/2022 | Gao | | G06F 1/08 |

OTHER PUBLICATIONS

International Search Report and Written Opinion issued in International Application No. PCT/CN2019/084888 dated Feb. 3, 2020 (7 pages).

IEEE 1588, "IEEE Standard for a Precision Clock Synchronization Protocol for Networked Measurement and Control Systems", IEEE Instrumentation and Measurement Society, Jul. 2008 (289 pages).

ITU-T Telecommunication Standardization Sector of ITU, G.8275.2/Y.1369.2, "Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet of Things and Smart Cities", Jun. 2016 (46 pages).

* cited by examiner

METHOD AND APPARATUS FOR SWITCHING CLOCK SOURCES

CROSS REFERENCE TO RELATED APPLICATION

This application is a 35 U.S.C. § 371 National Stage of International Patent Application No. PCT/CN2019/084888, filed Apr. 29, 2019.

TECHNICAL FIELD

The present disclosure generally relates to the field of signal processing, and more specifically to a method and apparatus for switching clock sources.

BACKGROUND

This section introduces aspects that may facilitate better understanding of the present disclosure. Accordingly, the statements of this section are to be read in this light and are not to be understood as admissions about what is in the prior art or what is not in the prior art.

Partial-Support Telecom Boundary Clock (T-BC-P) is a boundary clock with a plurality of Precision Time Protocol (PTP) ports which are connected to a plurality of Grandmasters (GMs) and one of which may be Slave and remaining ports of which may be in a state "Passive" or "Master", which is decided by the Best Master Clock Algorithm (BMCA). The Slave port may calculate and recover a phase/time which is distributed by an upstream GM and which will be distributed to a downstream clock via the Master ports. If the T-BC-P gets a new GM with a higher priority via another PTP port, a PTP clock may select this PTP port as the Slave port based on the BMCA, and the local phase/time may be calibrated based on the new GM and then distributed to the downstream clock. The prior art architecture for distribution of the phase/time with partial timing support from the network functions in the unicast mode only.

In an actual timing network environment, there may be a plurality of clock sources which can provide a high-accuracy Frequency or Phase. The T-BC-P may select a clock source which has the highest priority based on the Alternate BMCA. The T-BC-P has to spend some time calibrating the Frequency and Phase from the clock source. When the T-BC-P is locked to a clock source and providing the Frequency and Phase downstream, a higher priority clock source may connect to the network. According to the Alternate BMCA, the T-BC-P has to select the new clock source immediately, but its upstream node may not finish calibration for the current clock source. Therefore, at this point, the T-BC-P may provide unstable Frequency and Phase to its downstream nodes. If the downstream nodes are very sensitive to the input Frequency and Phase, a problem may occur.

A process for PTP port switchover when the new GM joins is shown in FIG. 1. As illustrated in FIG. 1, since the GM1 has priority1=10 and the GM2 has priority2=20, the T-BC-P-3 may select the GM1 as the best clock source. After some time, the Frequency and Phase on the T-BC-P-3 may be stable, and the Frequency and Phase from the GM2 may also be calibrated. The T-BC-P-3 may provide the stable Frequency and Phase to downstream devices, e.g., the T-BC-P/T-TSC-P (Partial-Support Telecom Time Slave Clock). Then, the T-BC-P-1 may be restarted, e.g. due to release upgrade, device replacement or node failure, etc. At this time, the T-BC-P-3 may smoothly switch over to the GM2. When the T-BC-P-1 is restored, the T-BC-P-3 will switch back to the GM1 immediately based on the Alternate BMCA. However, since the T-BC-P-1 may not have finished calibration for the GM1, quality of the Frequency and Phase distributed by the T-BC-P-1 to the T-BC-P-3 may not be adequate. The function of the downstream node may be negatively affected.

SUMMARY

It is an object of the present disclosure to propose a new method and apparatus for smooth switchover between clocks sources.

According to a first aspect of the present disclosure, a method for switching clock sources is provided. In the method, Precision Time Protocol, PTP, packets are monitored using each of PTP ports which connect to a new grandmaster. A frequency and a phase for the PTP port are calculated based on the PTP packets. In response to a successful check for the frequency and the phase, the PTP port is added to a candidate list.

In an alternative embodiment of the first aspect, the method may further comprise: in response to an unsuccessful check for the frequency and the phase, checking a frequency and a phase for a next PTP port of the PCT ports.

In a further alternative embodiment of the first aspect, the successful check may be fulfilled in response to the phase being in a PHASE_LOCKED state.

In a further alternative embodiment of the first aspect, the successful check may be fulfilled in response to the frequency being in a FREQ_LOCKED state and a value of the phase meeting a phase threshold.

In a yet further alternative embodiment of the first aspect, the phase threshold may be predetermined or may be dynamically changed by users.

According to a second aspect of the present disclosure, an apparatus for switching clock sources is provided. The apparatus comprises a processor and a memory communicatively coupled to the processor and adapted to store instructions. When the instructions are executed by the processor, the instructions cause the apparatus to perform operations of the method according to the above first aspect.

According to a third aspect of the present disclosure, a non-transitory computer readable medium having a computer program stored thereon is provided. When the computer program is executed by a set of one or more processors of an apparatus, the computer program causes the apparatus to perform operations of the method according to the above first aspect.

In the present disclosure, a phase calibration and a phase stability check may be introduced prior to the Alternate BMCA. Therefore, the clock source switchover may occur after the PTP port obtains a desired frequency and/or phase so that a stable frequency and phase output may be provided downstream.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
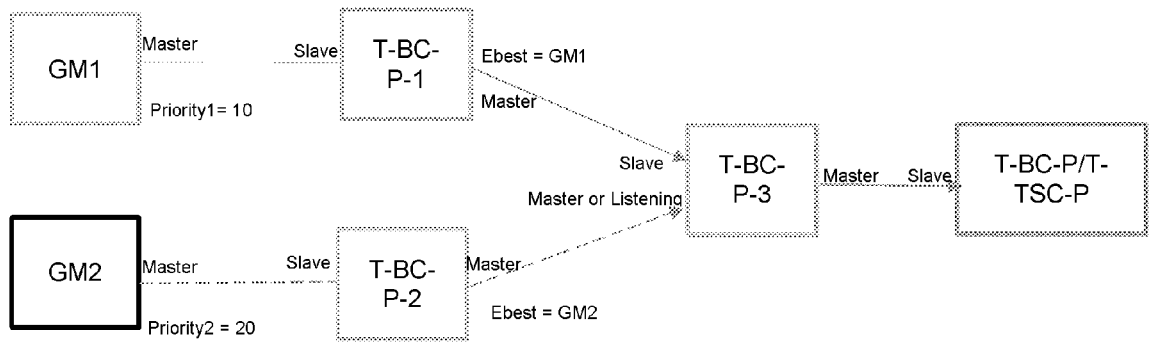
FIG. 1 is a diagram illustrating a process for switchover between clocks sources when a new GM joins.

The following detailed description describes a method and apparatus for switching clock sources. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed texts and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical interfaces to establish connections (to transmit and/or receive code and/or data using propagating signals) with other electronic devices. One or more parts of an embodiment of the present disclosure may be implemented using different combinations of software, firmware, and/or hardware.

According to the present disclosure, if there is a PTP Slave port in the T-BC-P, when a higher priority GM connects to the T-BC-P, a monitoring function may be involved prior to the Alternate BMCA. An additional PTP port of the T-BC-P which is connected to the new GM may monitor PTP packets and calculate the Frequency and Phase. After the additional PTP port finishes calibration for the new GM, the additional PTP port may be added into a BMCA candidate list. Based on a result of the Alternate BMCA, the PTP clock may smoothly switch over to the new higher priority GM with no impact on PTP performance.

Figure 2:
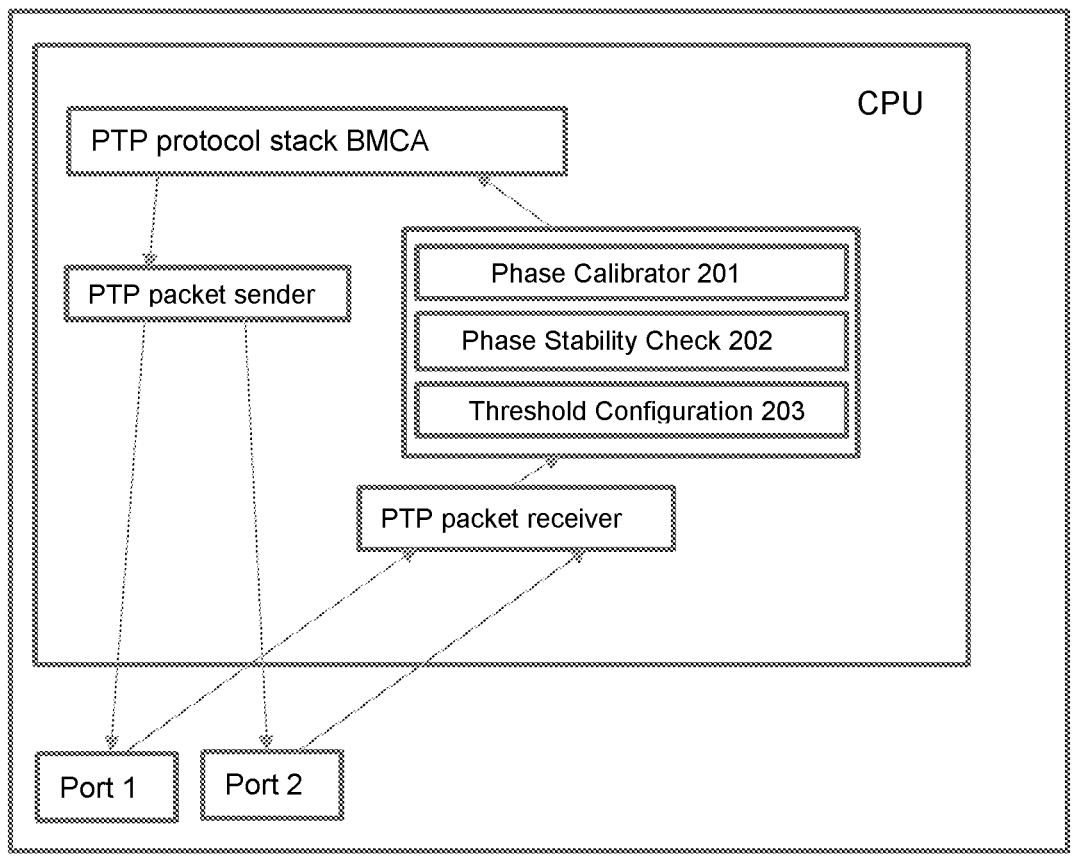
FIG. 2 is a block diagram illustrating exemplary functional modules for switchover between clock sources according to some embodiments of the present disclosure.

FIG. 2 is a block diagram illustrating exemplary functional modules for switchover between clock sources according to some embodiments of the present disclosure. After PTP packets are obtained by the PTP packet via the ports and before the PTP packets are transferred to the PTP protocol stack BMCA which in turn forwards the packets to the PTP packet sender, a phase calibrator module 201, a phase stability check module 202 and a threshold configuration module 203 may function in a way as specifically described with respect to FIG. 3 below.

Figure 3:
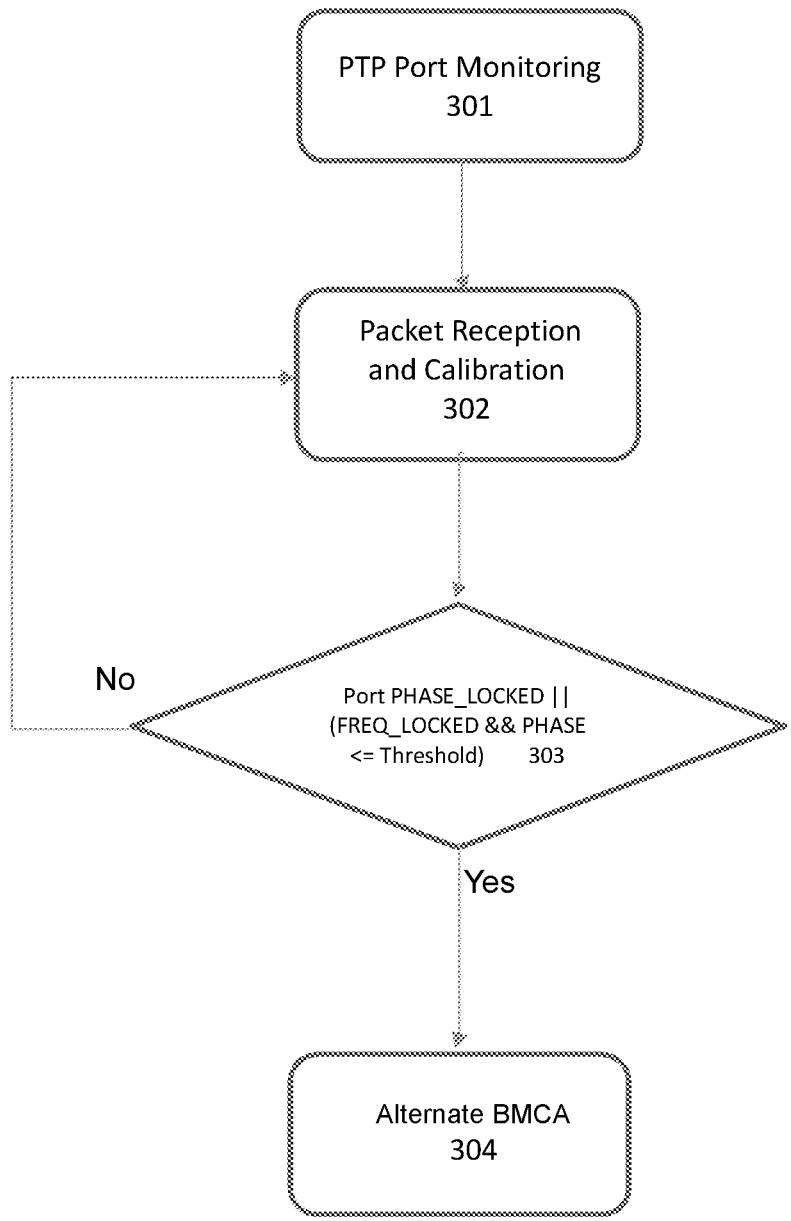
FIG. 3 is a flow chart illustrating exemplary processes for switchover between clock sources according to some embodiments of the present disclosure.

FIG. 3 is exemplary processes for switchover between clock sources according to some embodiments of the present disclosure. A phase calibration and a phase stability check may be introduced for each of the PTP ports which receive packets from the newly joined GM. These PTP ports may not become slave ports immediately when the new GM joins. The BMCA will take effect depending on a result of the stability check. Furthermore, threshold configuration may be provided for users to change a threshold value configured for the phase stability check.

At block 301, PTP port monitoring may be started. Then, in block 302, packets may be received via the PTP port and calibration may be performed, e.g. by the phase calibrator module 201 as shown in FIG. 2. The phase calibrator module 201 may obtain packets received through each PTP port, and calculate the Frequency and Phase for this PTP port based on the received packet stream. The phase calibration may trigger the phase stability check.

At block 303, the phase stability check may be made, e.g. by the phase stability check module 202 as shown in FIG. 2. The phase stability check module 202 may check whether the Frequency and Phase are locked. As an example, the phase stability check module 202 may determine whether the phase for the current PTP port is in a PHASE_LOCKED state, or whether the frequency for the current PTP port is in a FREQ_LOCKED state and the phase value for the current PTP port satisfies a threshold, e.g., above the threshold or below the threshold, and if so, the process may proceed to block 304. The block 303 may be a polling function in which if the result of the check is negative, the process may proceed back to block 302 with regard to a next PTP port. As a further example, the threshold for judging the phase value may be a predetermined threshold, or it may be a parameter dynamically changed by users.

At block 304, as a result of a successful check, the Alternate BMCA may be run.

Figure 4:
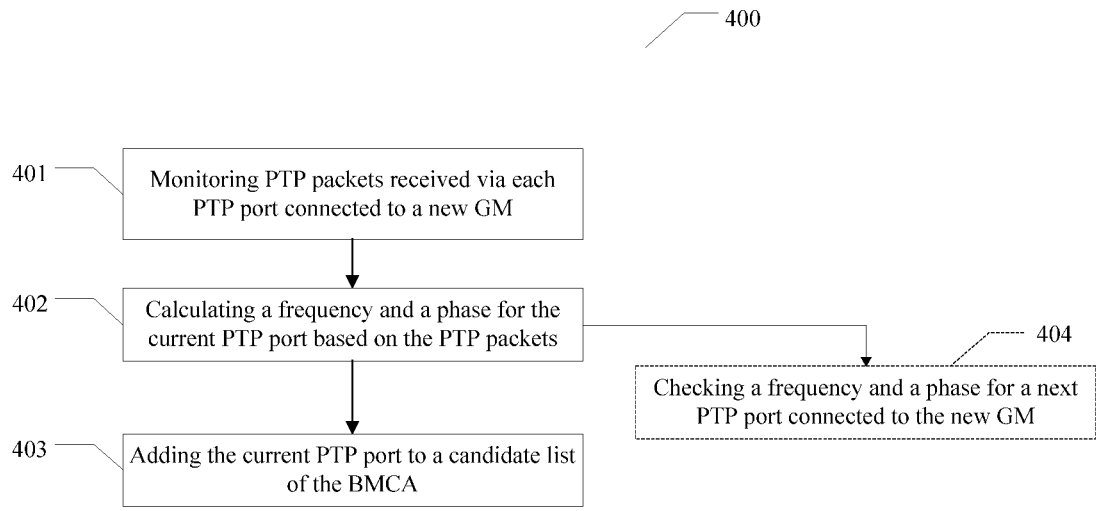
FIG. 4 is a flow chart illustrating a method for switching clock sources according to some embodiments of the present disclosure.

FIG. 4 is a flow chart illustrating a method 400 for switching clock sources according to some embodiments of the present disclosure. The method 400 may be performed in functional switching modules (e.g., those shown in FIG. 2) by way of example only for convenience of description but it is not limited thereto. As an example, operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the method 400 begins with monitoring PTP packets received via each of PTP ports connected to a new GM (block 401). Then, a frequency and a phase for the current PTP port may be calculated based on the received PTP packets (block 402). A phase stability check may be made to the frequency and the phase for the current PTP port. In the case that the check is successful, the current PTP port may be added to a candidate list for the BMCA (block 403).

As an example, if the check is unsuccessful, the phase stability check may be made to a frequency and a phase for a next PTP port connected to the new GM (block 404). In other words, the phase stability check may be made continually until the result is successful.

As an example, it may be determined that the check is successful if the phase for the checked PTP port is in a PHASE_LOCKED state. As another example, it may be determined that the check is successful if the frequency for the checked PTP port is in a FREQ_LOCKED state and the phase value for the checked PTP port meets a phase threshold. As a further example, the check may be successful if the frequency for the checked PTP port is in the FREQ_LOCKED state and the phase value for the checked PTP port is less than the phase threshold. As a still further example, the phase threshold may be a predetermined parameter or a parameter dynamically changed by users.

Figure 5:
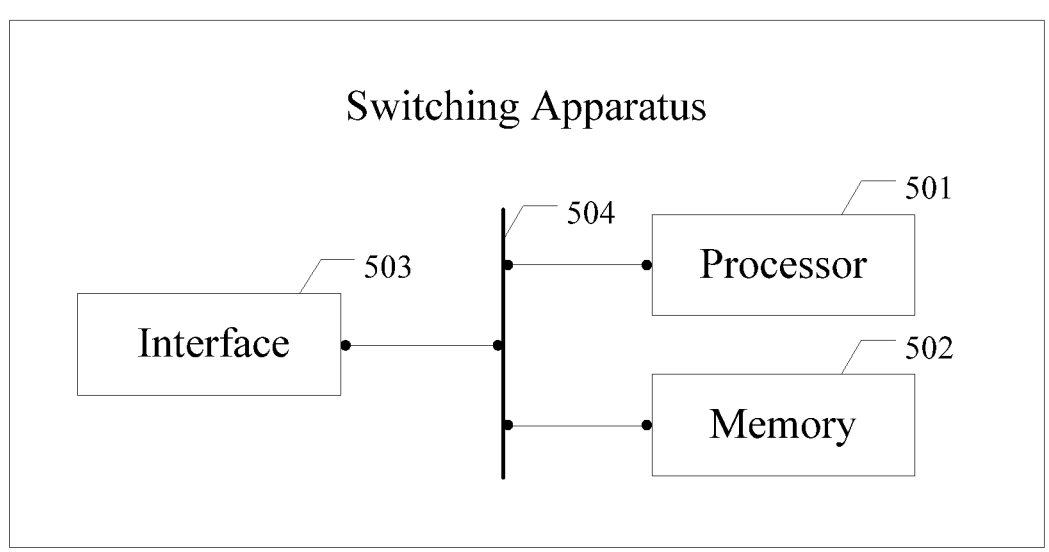
FIG. 5 is a block diagram illustrating an apparatus for switching clock sources according to some embodiments of the present disclosure.

FIG. 5 is a block diagram illustrating an apparatus 500 for switching clock sources according to some embodiments of the present disclosure. As an example, the apparatus 500 may be implemented in functional switching modules (e.g., those shown in FIG. 2), but it is not limited thereto. It should be appreciated that the apparatus 500 may be implemented using components other than those illustrated in FIG. 5.

With reference to FIG. 5, the apparatus 500 may comprise at least a processor 501, a memory 502, an interface 503 and a communication medium 504. The processor 501, the memory 502 and the interface 503 may be communicatively coupled to each other via the communication medium 504.

The processor 501 may include one or more processing units. A processing unit may be a physical device or article of manufacture comprising one or more integrated circuits that read data and instructions from computer readable media, such as the memory 502, and selectively execute the instructions. In various embodiments, the processor 501 may be implemented in various ways. As an example, the processor 501 may be implemented as one or more processing cores. As another example, the processor 501 may comprise one or more separate microprocessors. In yet another example, the processor 501 may comprise an application-specific integrated circuit (ASIC) that provides specific functionality. In still another example, the processor 501 may provide specific functionality by using an ASIC and/or by executing computer-executable instructions.

The memory 502 may include one or more computer-usable or computer-readable storage medium capable of storing data and/or computer-executable instructions. It should be appreciated that the storage medium is preferably a non-transitory storage medium.

The interface 503 may be a device or article of manufacture that enables the apparatus 500 to send data to or receive data from external devices.

The communication medium 504 may facilitate communication among the processor 501, the memory 502 and the interface 503. The communication medium 504 may be implemented in various ways. For example, the communication medium 504 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 5, the instructions stored in the memory 502 may include those that, when executed by the processor 501, cause the apparatus 500 to implement the method described with respect to FIG. 4.

Figure 6:
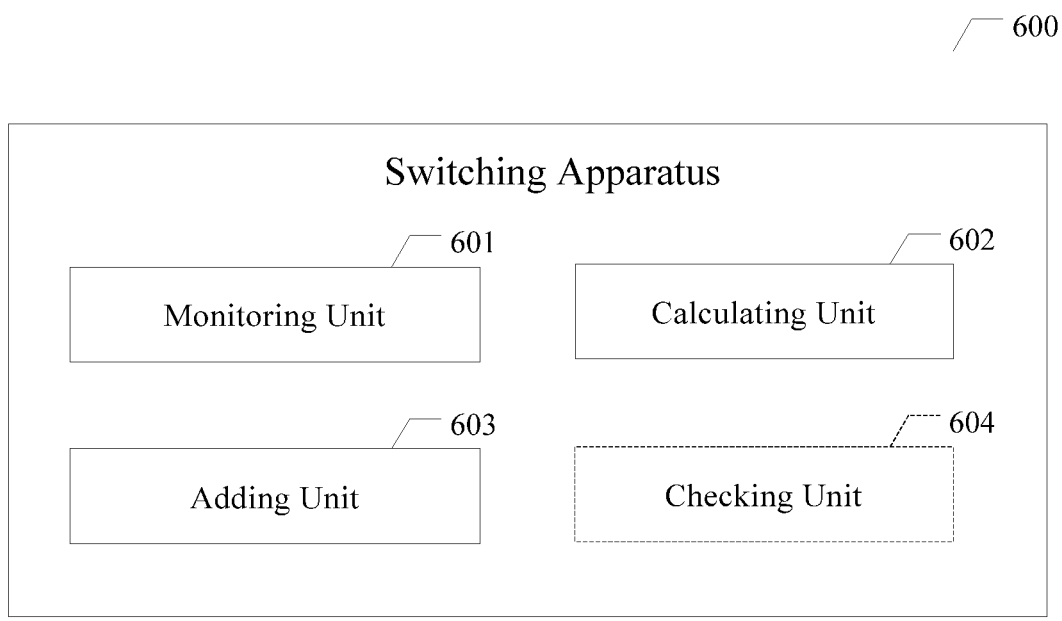
FIG. 6 is another block diagram illustrating an apparatus for switching clock sources according to some embodiments of the present disclosure.

FIG. 6 is another block diagram illustrating an apparatus 600 for switching clock sources according to some embodiments of the present disclosure. As an example, the apparatus 600 may be implemented in functional switching modules (e.g., those shown in FIG. 2), but it is not limited thereto. It should be appreciated that the apparatus 600 may be implemented using components other than those illustrated in FIG. 6.

With reference to FIG. 6, the apparatus 600 may comprise at least a monitoring unit 601, a calculating unit 602 and an adding unit 603.

The monitoring unit 601 may be adapted to perform at least the operation described in the block 401 of FIG. 4. The calculating unit 602 may be adapted to perform at least the operation described in the block 402 of FIG. 4. The adding unit 603 may be adapted to perform at least the operation described in the block 403 of FIG. 4.

As an example, the apparatus 600 may further comprise at least a checking unit 604. The checking unit 604 may be adapted to perform at least the operation described in the block 404 of FIG. 4.

Some units are illustrated as separate units in FIG. 6. However, this is merely to indicate that the functionality is separated. The units may be provided as separate elements. However, other arrangements are possible, e.g., some of them may be combined as one unit. Any combination of the units may be implemented in any combination of software, hardware, and/or firmware in any suitable location. For example, there may be more controllers configured separately, or just one controller for all of the components.

The units shown in FIG. 6 may constitute machine-executable instructions embodied within e.g. a machine readable medium, which when executed by a machine will cause the machine to perform the operations described. Besides, any of these units may be implemented as hardware, such as an application specific integrated circuit (ASIC), Digital Signal Processor (DSP), Field Programmable Gate Array (FPGA) or the like.

Some portions of the foregoing detailed description have been presented in terms of algorithms and symbolic representations of transactions on data bits within a computer memory. These algorithmic descriptions and representations are ways used by those skilled in the signal processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more signal processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed signal processing components and fixed hard-wired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method for switching clock sources, the method comprising:
    monitoring Precision Time Protocol (PTP) packets received via a first PTP port connected to a new grandmaster (GM);
    calculating a frequency and a phase for the first PTP port based on the received PTP packets;
    based on the calculated frequency and phase for the first PTP port, determining whether to add the first PTP port to a list of candidate ports; and
    selecting a slave port using the list of candidate ports.

2. The method of claim 1, further comprising:
    in response to determining not to add the first PTP port to the list, determining whether to add to the list a second PTP port connected to the new GM.

3. The method of claim 1, wherein determining whether to add the first PTP port to the list of candidate ports comprises determining whether the phase for the first PTP port is in a PHASE_LOCKED state, and
    the method further comprises adding the first PTP port to the list as a result of determining that the phase is in the PHASE_LOCKED state.

4. The method of claim 1, wherein determining whether to add the first PTP port to the list of candidate ports comprises determining whether the frequency is in a FREQ_LOCKED state and a value of the phase meets a phase threshold, and
    the method further comprises adding the first PTP port to the list as a result of determining that the frequency is in the FREQ_LOCKED state and the value of the phase meets the phase threshold.

5. The method of claim 4, wherein the phase threshold is predetermined or is dynamically changed by users.

6. An apparatus for switching clock sources, comprising:
    a processor; and
    a memory communicatively coupled to the processor and adapted to store instructions which, when executed by the processor, cause the apparatus to perform the method of claim 1.

7. A non-transitory computer readable medium having a computer program stored thereon which, when executed by a set of one or more processors of an apparatus, causes the apparatus to perform operations of the method of claim 1.

* * * * *